A. W. ROBINSON.
BALL JOINT FOR DISCHARGE PIPES OF HYDRAULIC DREDGES.
APPLICATION FILED SEPT. 29, 1910.
1,053,648.
Patented Feb. 18, 1913.
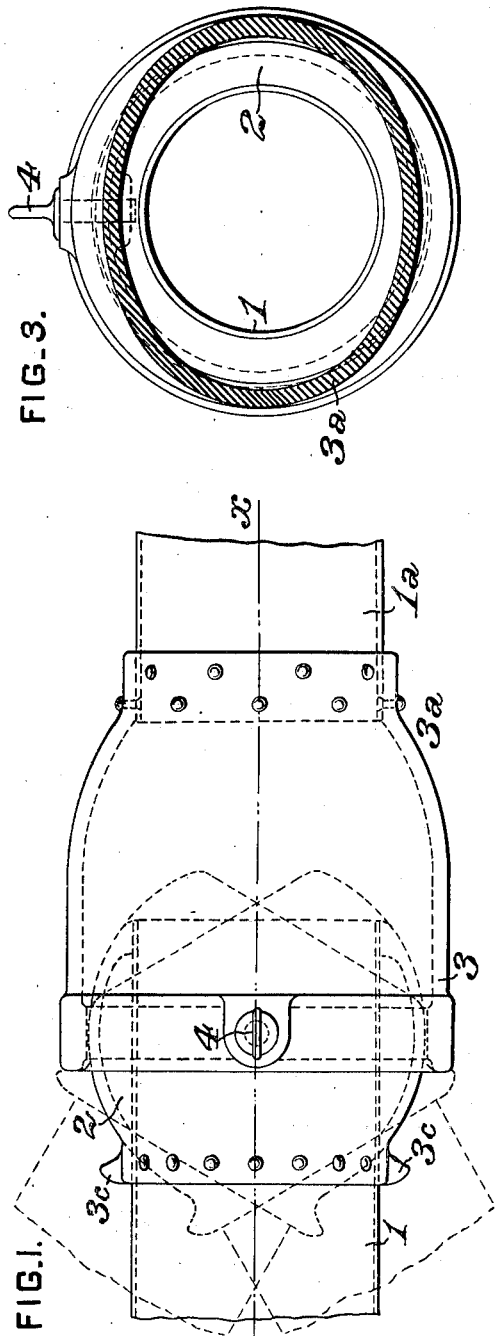
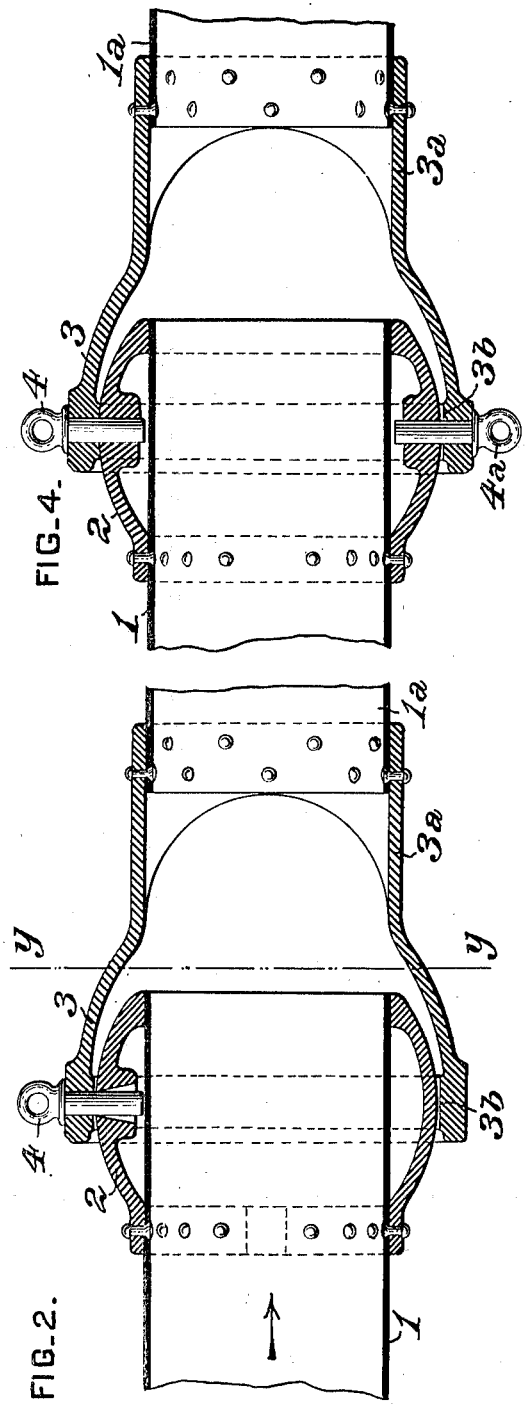
WITNESSES
James C. Herron
S. R. Bell
INVENTOR
Arthur W. Robinson,
by Snowden Bell
Atty

UNITED STATES PATENT OFFICE.

ARTHUR W. ROBINSON, OF MONTREAL, QUEBEC, CANADA.

BALL-JOINT FOR DISCHARGE-PIPES OF HYDRAULIC DREDGES.

1,053,648.      Specification of Letters Patent.      Patented Feb. 18, 1913.

Application filed September 29, 1910. Serial No. 584,468.

*To all whom it may concern:*

Be it known that I, ARTHUR W. ROBINSON, of Montreal, in the Province of Quebec and Dominion of Canada, have invented a certain new and useful Improvement in Ball-Joints for Discharge-Pipes of Hydraulic Dredges, of which improvement the following is a specification.

My present invention relates to ball and socket joints for the discharge pipes of hydraulic dredges, of the general class or type of that which is exemplified in Letters Patent of the United States No. 746,994, granted and issued to me under date of December 15, 1903, and its object is to simplify and economize the construction of a joint of such type, and to provide means for the ready connection and disconnection of the joint members.

The improvement claimed is hereinafter fully set forth.

In the accompanying drawings: Figure 1 is a plan view of a joint embodying my invention; Fig. 2, a longitudinal section, on the line $x$ $x$ of Fig. 1; Fig. 3, a transverse section, on the line $y$ $y$ of Fig. 2; and Fig. 4, a section similar to that of Fig. 2, but showing a minor structural modification.

My invention is herein illustrated as applied in the articulation of two sections, 1 and 1ª, of the discharge pipe of a hydraulic dredge, through which liquid flows in the direction of the arrow in Fig. 2. A segment of a sphere, 2, suitably secured, as by rivets, to the section, 1, of the discharge pipe, constitutes the ball member of the joint, and a segment of a sphere, 3, of larger diameter and provided with a neck, 3ª, terminating in cylindrical form, at its smaller end, is secured to the section, 1ª, of the discharge pipe, and constitutes the socket member of the joint. The concavity of the socket member is not such as to fit on the surface of the ball, and an internal guide face, 3ᵇ, is formed upon the socket member adjacent to its outer end, where it is nearest to and tends to bear on the ball member. The cylindrical bore of the guide face portion of the socket member is concentric with the axis thereof, and is slightly greater than the diameter of the ball member, upon which it has what may be termed a parallel fit, so that the ball member may be readily entered into and withdrawn from the socket member, in connecting and disconnecting the two as desired.

The ball and socket members are maintained in normal relation, and the blowing of the ball member out of the socket member, by internal pressure, is prevented, by a connecting pin, 4, which is fitted in the socket member and fits freely in a tapered socket in the ball member, thereby preventing relative end movement of the joint members, while permitting free lateral deflection of the connected discharge pipe sections. As shown in Fig. 2, a single connecting pin is located at the top of the joint, but, if preferred, another pin, 4ª, may be applied, in line axially therewith, at the bottom of the joint, as shown in Fig. 4.

In practice, when floating sections of discharge pipes of hydraulic dredges are articulated together, the deflection of the pipe sections is in a horizontal direction only as they float upon the water, as indicated in dotted lines in Fig. 1. The vertical deflection is slight and due only to that caused by wave action. As will be seen from Fig. 2, a moderate degree of vertical deflection is permitted when the connecting pin is used only at the top of the joint, the lower portion of the ball being then free to move slightly in and out over the parallel guide face, 3ᵇ. In joints for this service, absolute water tightness is not required, and therefore it is not necessary to employ any special packing or to provide a curved fit of the ball and socket members, as is sometimes done. As a matter of fact, the distinguishing and characteristic feature of a ball and socket joint having the parallel fit herein set forth, consists in its being self packing, owing to the solid matter (sand or mud) in the discharge, lodging or packing in the tapering space between the spherical surface of the ball and the flat guide face of the socket. As before stated, the ball member is made of such diameter as to enter the socket member with a small amount of clearance, which would permit only a correspondingly small amount of leakage with water only. As soon, however, as the dredging operation begins, this leakage is immediately taken up and plugged from the inside, by a deposit of solid matter, and this action takes place for all positions of the ball member within its range of movement.

The joint herein set forth being designed mainly to admit of horizontal deflection only of the connected pipe sections, as indicated in Fig. 1, the horizontal diameter of the socket member is made greater than its vertical diameter, at the inner end of the ball member, as shown in the vertical transverse section, Fig. 3, in order to provide sufficient clearance, which clearance is not necessary in the plane of the connecting pin. Further, it will be seen that a slight, but sufficient, degree of vertical deflection may be afforded, so long as the point of tangency of the ball member within the parallel fit of the guide face, $3^b$, does not fall outside of the latter.

In order to properly limit the degree of movement of the ball member within the socket member, the former is provided with opposite lateral lugs, $3^c$, one or the other of which is adapted to bear against the outer end of the socket member at the limit of relative movement in either direction.

Any suitable known form of float may be used to carry the sections of the discharge pipe when the latter is employed as a floating pipe, or the joint herein set forth may be applied in connection with discharge pipe sections extending on land.

I claim as my invention and desire to secure by Letters Patent:

1. In a ball joint for discharge pipes of hydraulic dredges, the combination of a ball member having a segmental spherical surface, a socket member having a cylindrical end bore, surrounding and of slightly greater diameter than the ball member, whereby a tapered space for the deposit of solid matter is provided between the ball and socket members, a connecting pin fitted in the socket member, and an outwardly tapered socket in the ball member inclosing the inner portion of the connecting pin.

2. In a ball joint for discharge pipes of hydraulic dredges, the combination of a ball member having a segmental spherical surface, a socket member having a cylindrical end bore, surrounding and of slightly greater diameter than the ball member, whereby a tapered space for the deposit of solid matter is provided between the ball and socket members, a connecting pin fitted in the socket member and fitting freely in an outwardly tapered socket in the ball member, and lateral stop lugs formed on the ball member in position to abut on the socket member, at the limits of relative movement of the members.

ARTHUR W. ROBINSON.

Witnesses:
VALENTINE J. R. CHRISTIAN,
FRANCIS E. M. ROBINSON.